May 31, 1938.　　A. R. SPICACCI　　2,118,902
GRINDING MACHINE
Filed Aug. 1, 1935　　6 Sheets-Sheet 1

INVENTOR:
ATTILIO R. SPICACCI,
BY Gales P. Moore
HIS ATTORNEY.

May 31, 1938.  A. R. SPICACCI  2,118,902
GRINDING MACHINE
Filed Aug. 1, 1935  6 Sheets-Sheet 3

INVENTOR:
ATTILIO R. SPICACCI,
BY Gales P. Moore
HIS ATTORNEY.

May 31, 1938.  A. R. SPICACCI  2,118,902
GRINDING MACHINE
Filed Aug. 1, 1935  6 Sheets-Sheet 6

INVENTOR:
ATTILIO R. SPICACCI,
BY Gales P. Moore
HIS ATTORNEY.

Patented May 31, 1938

2,118,902

UNITED STATES PATENT OFFICE 2,118,902

GRINDING MACHINE

Attilio R. Spicacci, Bristol, Conn., assignor to General Motors Corporation, Detroit, Mich., a corporation of Delaware Application August 1, 1935, Serial No. 34,148

31 Claims. (Cl. 51—94)

This invention relates to grinding machines and comprises all of the features and aspects of novelty herein disclosed. By way of example, the invention is illustrated in connection with the formation of elliptical race curvatures for race rings of antifriction bearings.

In the usual ball bearing, the raceway grooves are transversely arcuate and have a radius of curvature which is slightly larger than the radii of the balls. These raceways are usually produced on an oscillating grinding machine in which either the work or a grinding wheel is oscillated around a center. It has been found that certain raceway curvatures which are not circularly arcuate have certain advantages in respect to load capacity and endurance when applied to ball bearings, especially elliptical raceways wherein the curvature is defined by that part of an ellipse adjacent one end of the major axis. Accuracy of curvature is very important to get the desired advantages, and a departure of even one ten-thousandth part of an inch from the desired curve is too large an error to be allowable.

An object of the invention, accordingly, is to provide a machine to generate accurately a noncircular curve, especially an elliptical curve. Another object is to produce a predetermined curve on a work-piece without the use of prepared templates and yet to create that curve by simple mechanism and motions which can be accurately and reliably controlled. Still another object is to provide a machine for producing a bearing raceway having a transverse curvature conforming to that portion of an ellipse adjacent to one end of the major axis. Another object is to provide a machine for producing elliptical race curvatures of different but accurately controllable characteristics, as by selecting the lengths of the major and minor axes. To these ends and also to improve generally upon devices of this character, the invention consists in the various matters hereinafter described and claimed. In its broader aspects, the invention is not necessarily limited to the specific constructions selected for illustrative purposes in the accompanying drawings in which

In generating an elliptical curve, this invention utilizes the principle that a particle travelling around the axis of a right cylinder in the surface thereof and also in an inclined plane will generate an ellipse. The minor axis of the ellipse is then the diameter of the cylinder and the major axis depends on the inclination. The ellipse can be varied to suit the particular bearing by changing the inclination or the diameter or both. Inasmuch as the desired curve is rather small in practice, actual movement of the generating member is controlled by rigidly connected and accurately mounted parts one of which moves in an amplified and hence accurately controlled ellipse which has a known relation to the desired elliptical path of the generating member.

The curvature may be directly generated upon the race ring or work itself or may be generated upon an abrading member which transfers the curve to the work.

Figure 8:
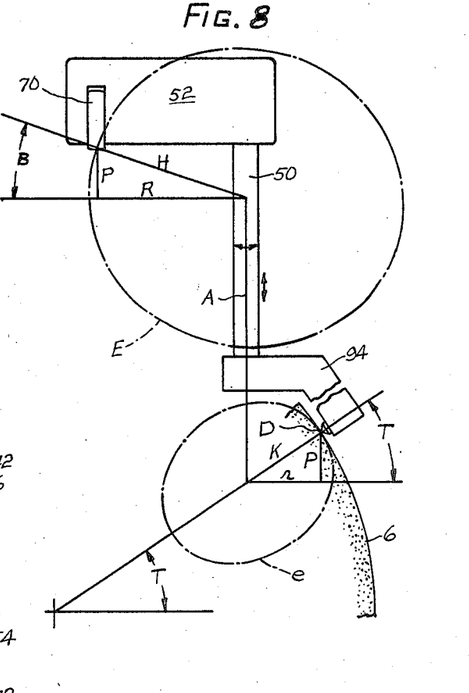
Figs. 8 and 9 are diagrams.
Figure 9:
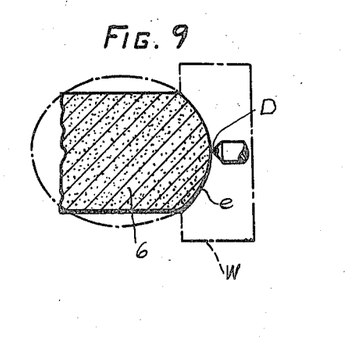

In Fig. 8, the line A represents the axis of a cylinder, and a generating member D moves around such axis in an inclined plane represented by the line K having the inclination T which can be selected. Referring to the triangle having sides K, P and r, the generating point moves angularly or oscillates at a selected distance r from the axis while also having a selected vertical travel of an amplitude represented by the line P. The ellipse generated is indicated by the broken line e shown as 90° out of its proper plane, such ellipse becoming more nearly circular if the inclination of K is decreased so that the distance K which is the semi-major axis approaches the distance r which is the semi-minor axis. Inasmuch as the distances r and P are small (though exaggerated in the diagram), control of the path of the generating member is effected by certain rigidly connected members of rugged construction whose path is of related but more ample dimensions. A cam roller 70 travels on a cam represented as an inclined plane H having a selected inclination B. The line R represents the distance of the roller contact point from the axis A, and the roller has a vertical travel represented by line P, the roller imparting the same vertical travel to the connected member D. The contact point of the roller with the cam also travels in an ellipse E which is more nearly circular than the desired ellipse e but has a predetermined and computable relation to the latter. The generating member or point D may be a diamond for producing a transverse elliptical curve on a grinding wheel which transfers the shape to a work-piece.

Figures 1, 2, 3:
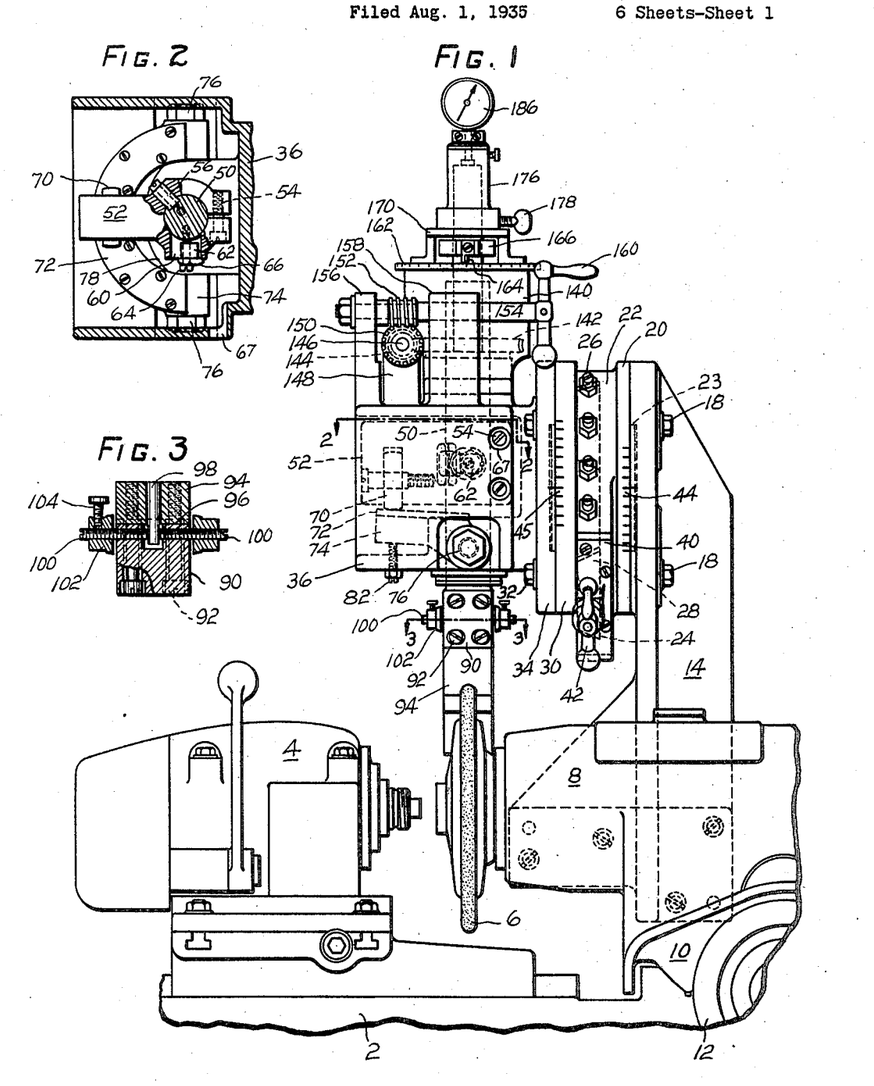
Fig. 1 is a front elevation of a grinding machine.
Fig. 2 is a sectional view on the line 2—2 of Fig. 1 but showing some parts broken away at a lower level.
Fig. 3 is a sectional view on the line 3—3 of Fig. 1.
Figures 4, 4A, 5:
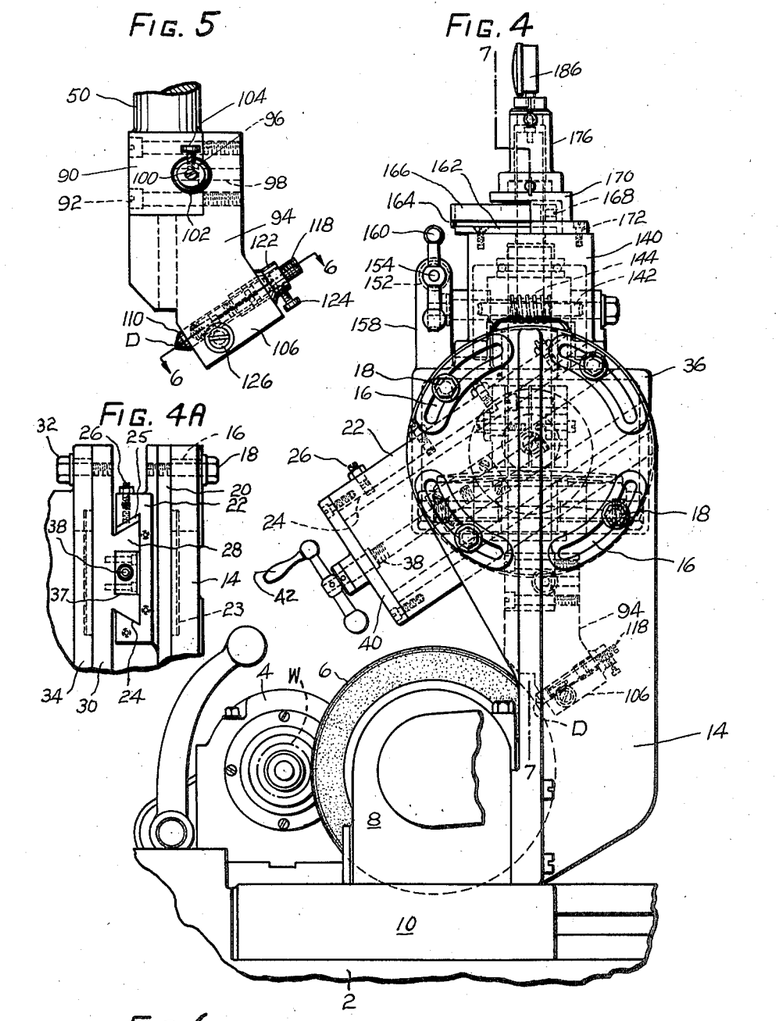
Fig. 4 is a side elevation of the grinding machine.
Fig. 4A is a front view of a slide.
Fig. 5 is a view of portions of Fig. 4 enlarged.
Figure 6:
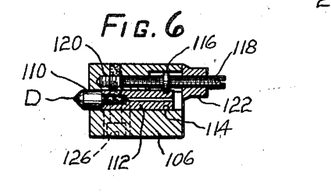
Fig. 6 is a sectional view on line 6—6 of Fig. 5.

In Figs. 1 and 4, the numeral 2 indicates a frame supporting a work head 4 which may have any suitable chuck to hold and rotate a work-piece W (indicated by broken lines in Fig. 4) in contact with a grinding wheel 6. The grinding wheel 6 is rotatably supported by a head 8 having a cross feed slide 10 controlled by a hand wheel 12. Bolted to the rear of the head 8 is an upright bracket 14 whose upper end is provided with arcuate slots 16 for clamping screws 18 which adjustably secure a circular flange 20 of an inclined slide base 22. The flange 20 has a centering plug 23 entering a circular recess in the bracket 14. The slide base has dovetail ways 24 one of which is provided with an adjustable gib 25 secured by screws 26. A dovetail tongue or slide 28 projects laterally into the ways from a circular flange 30 which is adjustably secured by clamping screws 32 to a circular flange 34 on a carrier 36, the flange 34 having arcuate slots similar to the arcuate slots 16. The tongue or slide 28 has a nut 37 for a feed screw 38 which is journalled for rotation without endwise movement in an end plate 40 fastened at the front of the slide base 22, a crank 42 serving to turn the screw. The screw adjusts the slide and the connected generating member or diamond D along an inclined section K of the grinding wheel 6, as shown in Fig. 8, as for the purpose of compensating for wear or change in size of the latter. The slide base has the above mentioned inclination represented by the angle T and this inclination can be varied by the clamping screws 18 and the slots 16, a suitable scale 44 co-operating with an index line to show the angularity or inclination. A similar scale 45 on the flange 30, but graduated in the opposite direction, indicates the angular adjustment of the flange 34 and the parts carried by the carrier 36, such parts having a corrective angular adjustment to bring the generating member or diamond D back to the wheel periphery when moved away by adjustment of the inclination of the slide base.

Figure 7:
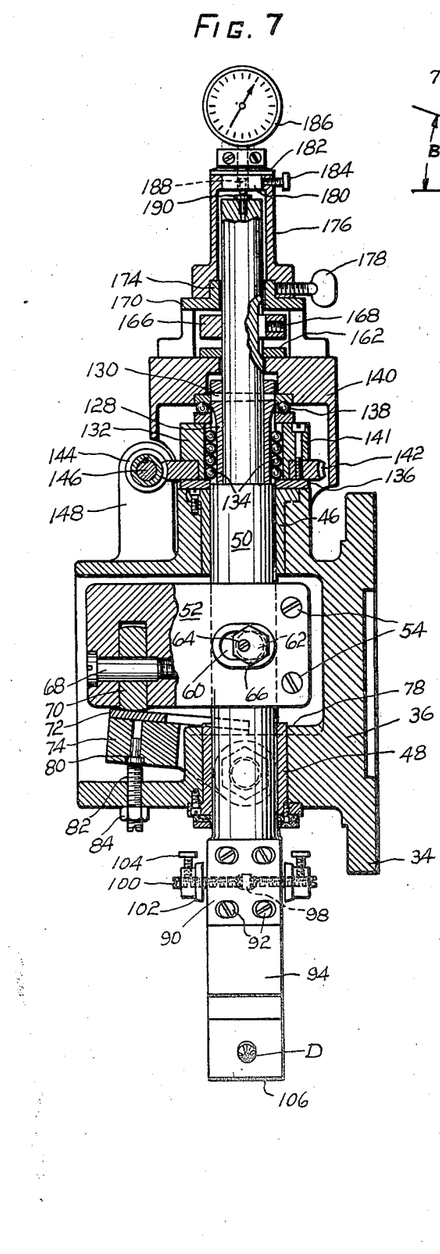
Fig. 7 is chiefly a vertical sectional view on the line 7—7 of Fig. 4.

The carrier 36 (see Fig. 7) has flanged bearing bushings 46 and 48 which support an upright shaft 50 for oscillation and vertical sliding. An arm 52 is fastened to the shaft by clamping screws 54, the arm being split as shown in Fig. 2 and having a vertical slot for a key 56 which enters a vertical keyway in the shaft, thus preventing relative rotation but providing for vertical adjustment of the arm on the shaft. To control a fine adjustment, the arm has a horizontal slot 60 receiving an eccentric 62 which can be turned on a supporting screw 64 projecting from the shaft. To control turning of the eccentric, the latter has a nut-like head 66. The clamping screws 54 are accessible through holes 67 in the carrier 36 and the eccentric head is accessible from an open side of the carrier. A screw stud 68 rotatably supports a cam follower or roller 70 in a slot of the arm 52. The roller is transversely curved to have a rolling point of contact on an arcuate cam plate 72 which is secured by screws to a cam supporting yoke 74. The yoke has an adjustable inclination provided by pivot screws 76 extending into a lug 78 of the carrier 36. The yoke has a wear plug 80 engaging the upper end of a vertical adjusting screw 82 which is threaded in a web of the carrier 36. A lock nut 84 holds the screw 82 in adjusted position with the cam in the selected inclined plane H of Fig. 8. From the foregoing, it is apparent that, upon angular oscillation of the shaft 50 in its bearings, the cam and the cam roller will control vertical sliding of the shaft, the amplitude of vertical movement being determined by the inclination of the cam and the extent of angular oscillation of the arm 52.

The lower end of the shaft 50 has a squared enlargement 90 with slots for clamping screws 92 which adjustably anchor a detachable and replaceable bracket or arm 94 to the shaft. The slots provide for lateral adjustment of the bracket, the latter having a guide tongue 96 (Figs. 3 and 5) slidable in a groove of the enlargement 90. A pin 98 is driven into a hole of the bracket or arm 94 and has a flattened portion entering a slot in the enlargement. Vernier screws 100 are threaded in the enlargement in a position to abut against opposite sides of the flattened portion of the pin. A dial 102 is secured to each screw by a clamping screw 104. The foregoing mechanism provides for accurate adjustment of the bracket or arm laterally so as to locate the generating member D in the plane of the center of the grinding wheel. The bracket or arm 94 has a rearwardly offset and inclined extension 106 for a cone-ended stud 110 which supports the diamond D. The stud has a shank secured to a slidable pin 112 which is adjustable endwise in a guide opening of the extension. The pin has an annular notch 114 into which projects a collar 116 on an adjusting screw 118 which is threaded in a tapped opening 120 of the extension 106. A dial 122 is fixed to the adjusting screw by a clamping screw 124. This adjustment provides for movement of the diamond D along a radius of the grinding wheel 6 and it also determines the distance of the diamond from the axis of oscillation. In other words, it determines the radius r or horizontal distance of the diamond from the axis A as indicated in Fig. 8. This distance r is also one half the minor axis of the ellipse e because the point D is always in the surface of a cylinder having the radius r. The slide pin 112 is clamped in adjusted position by a clamping screw 126.

The upper portion of the shaft 50 (see Fig. 7) is reduced in diameter to receive a sleeve 128 which is keyed from rotation on the shaft by a taper pin 130. The sleeve has opposite pairs of elongated vertical slots mating with similar slots in a hub member 132, and in the mating slots are rows of balls 134. Thus the hub member is keyed to the sleeve by the balls but the shaft and sleeve can freely slide vertically. The hub member is held from vertical movement by a thrust washer 136 and by a ball thrust bearing 138, the latter being partly confined in a recess of a skirted housing 140 which is fastened to the carrier 36. The hub member is fastened by screws 141 to a worm wheel 142 driven by a worm 144 on a shaft 146 which is journalled in lugs 148 on the carrier 36. The shaft 146 also carries a worm wheel 150 driven by a worm 152 keyed to a shaft 154 which is journalled in lugs 156 and 158 on the carrier 36. The shaft is turned by a crank 160 and this provides the power for giving the shaft and the diamond their oscillating and vertical shifting movements. The shaft and its larger arm 52 and its shorter arm 94 form a rugged unit which gives a compound movement to the diamond D without lost motion, the movement being compounded of oscillation around an axis A intersecting the grinding wheel parallel to the sides thereof and translation or linear movement parallel to said axis, said linear movement being controlled by and directly proportional to the angular movement in each direction.

Fixed by screws to the top of the housing 140 (see Figs. 1 and 4) is a dial plate 162 having graduations co-operating with a pointer 164 fastened to the front of an arm 166 which is keyed to the shaft 50 and secured by a screw 168. This device indicates the angle through which the shaft swings. The arm 166 will rise or fall with the shaft, its rear end being contained in a housing 170 which is fastened by screws 172 to the top of the housing 140. The housing 170 is open at the front to expose the dial and has an upright flange 174 to which an extension housing 176 is secured by a thumb screw 178. An opening at the top of the extension housing receives a plug 180 which is carried by a cap 182 and fastened by a set screw 184. The cap has any suitable clamping means to hold a dial indicator 186 whose indicator stem 188 is slidable through the cap and plug to bear against a wear plug 190 in the top of the shaft 50. The indicator is used to determine the vertical movement of the shaft and enables the cam 72 to be set by the adjusting screw 82 at the proper inclination to give the desired vertical movement of the shaft for a given angular oscillation, the latter being determined by the dial 162. The adjustment afforded by the eccentric 62 when the clamping screws 54 are loosened gives a delicate adjustment of the shaft and diamond vertically up or down in order that the diamond may just touch the wheel in the central plane when the cam roller 70 is in its highest position on the cam.

In operation, the crank 160 is turned to swing the shaft 50 and the diamond or generating point D back and forth. The diamond must travel in an ellipse across the grinding wheel because, while oscillating around an axis, it is also caused to shift parallel to that axis by the cam. A partial revolution of the shaft is sufficient to generate an elliptical contour on the grinding wheel. The previously described adjustments provide for varying the character of the ellipse. Decreasing the inclination B of the cam 72 will obviously decrease the vertical travel P and the ellipse will more nearly approach a circle. This is equivalent to decreasing the distance K which is necessarily the semi-major axis of the ellipse. The character of the ellipse can also be varied by adjusting the distance r which is always the semi-minor axis of the ellipse because it is the radius of a cylinder in the surface of which the point D moves while in the inclined plane K.

In Figs. 10 to 16, the curvature is generated directly upon the work W by causing a controlled relative shifting movement between the work and a grinding wheel and, in the selected embodiment, the work is shifted in an elliptical path while the wheel merely rotates on a fixed axis. A work head 202 is mounted on an upper slide 204 for longitudinal adjustment controlled by a feed screw 206. This adjustment will center the work with respect to the wheel. The upper slide is supported on a cross slide 208 adjustable by a feed screw 210 on a swingable supporting arm 212, the latter having an operating handle 213. The arm is connected to a vertical shaft 214 which is mounted to rotate and to slide vertically in suitable bearings of a casing 216 depending from a frame 218. The crosswise adjustment of the slide 208 will position the work at the desired distance from the shaft 214 and will thus determine the radius r of Fig. 15.

Figure 10:
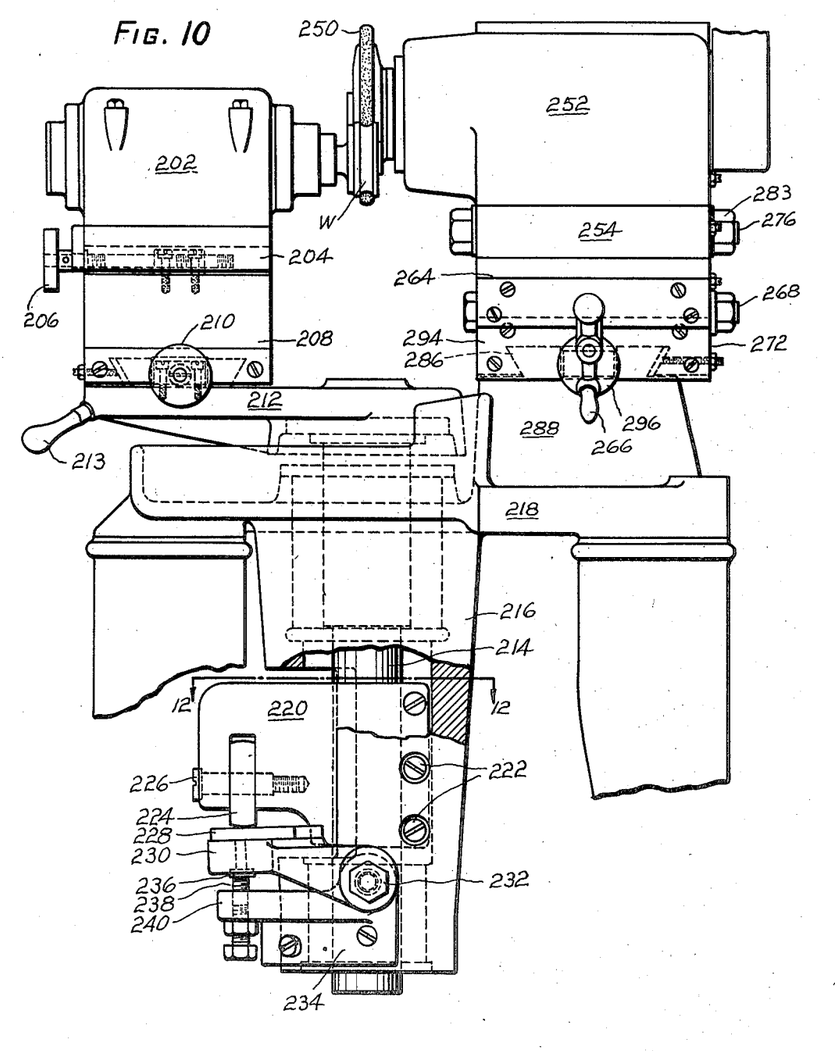
Fig. 10 is a front elevation, partly broken away and in section, of a grinding machine of modified construction but utilizing the same basic principles of curve generation as in the preceding figures.
Figure 11:
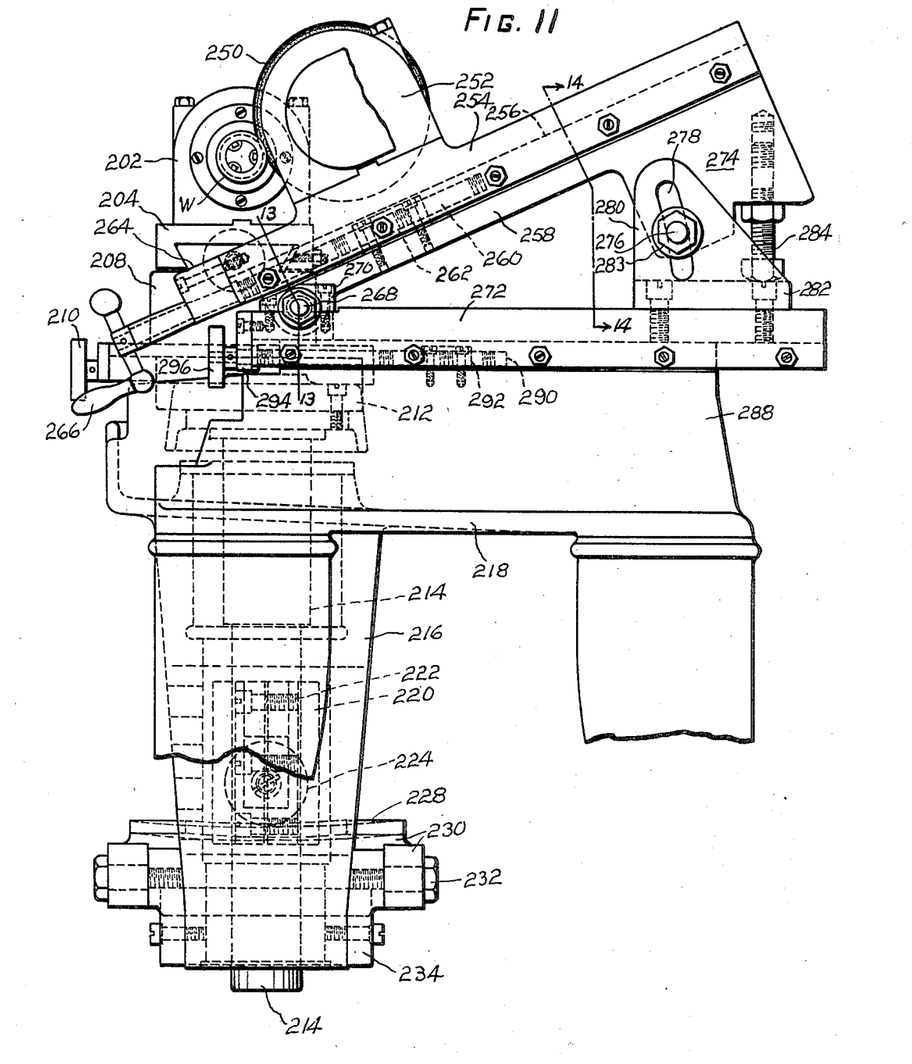
Fig. 11 is a side elevation of Fig. 10.
Figure 12:
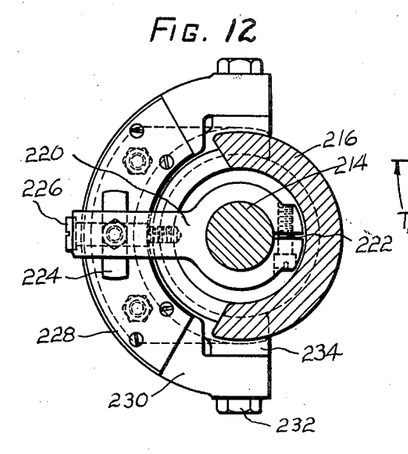
Fig. 12 is a section on the line 12—12 of Fig. 10.
Figure 13:
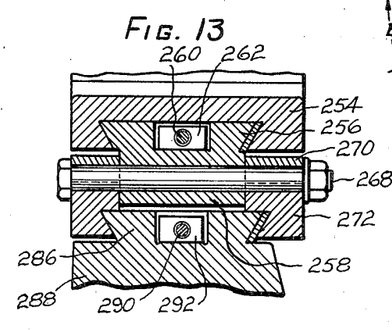
Fig. 13 is a section on the line 13—13 of Fig. 11.
Figure 14:
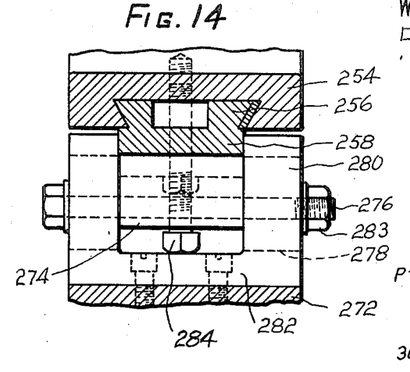
Fig. 14 is a section on the line 14—14 of Fig. 11.
Figure 15:
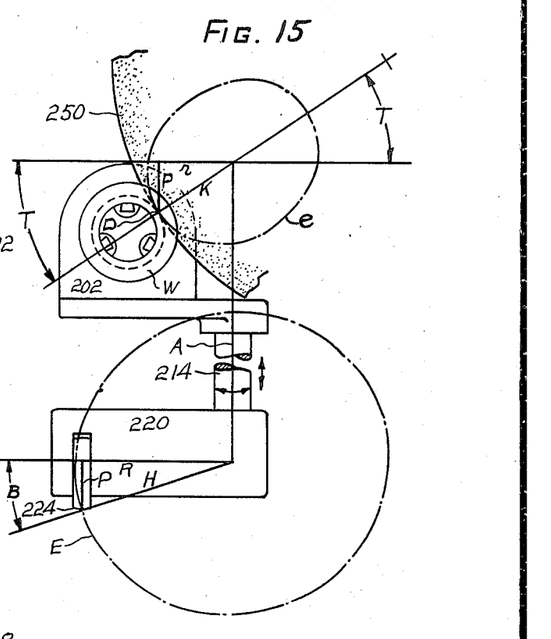
Figs. 15, 16 and 17 are diagrams.
Figure 16:
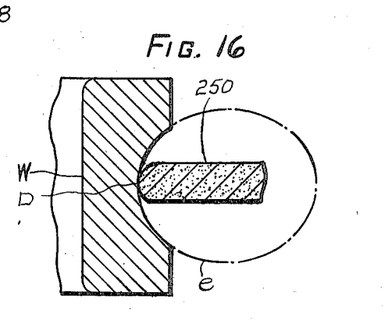

An arm 220 (corresponding to the arm 52 of Fig. 7) is fastened to the shaft 214 by clamping screws 222. A roller 224 is rotatably mounted in a slot of the arm 220 by a pivot stud 226 and runs on an arcuate cam plate 228 which is fastened by screws to a yoke 230. The yoke has its ends pivoted by pivot screws 232 to a bracket 234 fastened to the casing 216. A wear plug 236 on the yoke bears against the upper end of an adjusting screw 238 which is threaded in a lug 240 of the bracket 234. This adjustment provides for selecting the plane H or the angle of inclination B of the cam plate to give a predetermined rise and fall P to the work head as such work head is oscillated.

A grinding wheel 250 is rotatably mounted in a head 252 carried by an inclined slide 254 having a dovetail slot fitting a dovetail guide tongue 256 (Fig. 13) on a supporting bar 258. The slide is shiftable by a feed screw 260 threaded in a nut 262 on the bar 258, the screw being journalled for rotation without endwise movement in a plate 264 bolted to the slide. The feed screw has a hand crank 266 and its operation will shift the grinding wheel radially with respect to the point where it engages the work-piece W and so compensate for wear or change in diameter of the wheel. The bar 258 is supported at its lower end by a pivot bolt 268 which is secured by caps 270 in bearing recesses of a slide 272. At the higher end, the bar has a projection 274 carrying a clamping bolt 276 which passes through arcuate slots 278 in lugs 280 of a bracket 282. A nut 283 provides for clamping the projection 274 to the lugs with the bar 258 at a selected inclination which can be nicely determined by an adjusting screw 284. The setting determines the inclination of the plane K or the angle T. In order that the plane K may always pass through the centers of the wheel and the work the vertical location of the work can be varied, as by changing the position of the arm 220 on the shaft 214 by the clamping screws 222. The slide 272 has a dovetail slot guided on a dovetail tongue 286 of a support or table 288. A feed screw 290 is threaded in a nut 292 fastened to the support, the screw being journalled for rotation without endwise movement in a plate 294 attached to the front of the slide. The screw has an operating hand wheel 296 and its operation adjusts the wheel with respect to the particular work. When the work is thus oscillated around an axis A with the accompanying rise and fall P, every point in the workpiece is caused to travel in an elliptical path and every point along the grooved raceway will come in contact with the operative edge of the grinding wheel and an elliptical raceway having the curve e will be produced. The result is the same as if the operative point of the grinding wheel were moved in the same ellipse while the work is stationary or merely rotating on its axis. Hence the operative point of the grinding wheel may be regarded as the generating point D because that point and the raceway have relative movement in an ellipse. Also a single selected point on the member W could be made to generate an ellipse on the grinding wheel since it has a motion directly comparable to the generating point D of Fig. 8.

Figure 17:
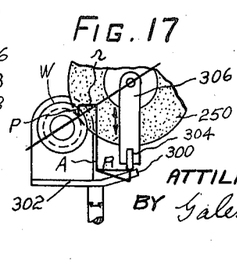

In the preceding illustrated constructions, the ellipse is produced by giving just one of the engaging members a movement of both oscillation and translation. In Figs. 1 to 9, the diamond is given the two simultaneous movements and in Figs. 10 to 16, the work is given these movements. As indicated diagrammatically in Fig. 17, one of the engaging members may be given oscillating movement around an axis and simultaneously the other member may be given the movement of translation. In this figure, the work W is oscillated around an axis A and the grinding wheel 250 is moved vertically, such vertical movement being controlled by an inclined cam 300 carried by an oscillating work support 302 and engaging a cam roller 304 on a vertically guided support 306 for the grinding wheel. Thus as compared with Fig. 15 wherein the work is moved up and down, the grinding wheel is moved down and up as the work oscillates. Thus the two constantly engaging members have a relative movement which will generate an ellipse on the work although neither member alone moves in an elliptical path. In the foregoing constructions, the motions are exceedingly simple and reliably controlled and the ellipse can be easily varied thus avoiding the expense of special templates to control the curvature.

I claim:

1. In a machine of the character described, a support for a grinding member, a support for a member having a point contact with the grinding member, means for oscillating one of said members around a fixed axis parallel to the sides of the grinding member to cause the point of contact to shift widthwise of one of the members, and means for causing said oscillated member to have a linear movement in the plane of the grinding member during said oscillation; substantially as described.

2. In a machine of the character described, a support for a grinding member, a support for a member engaging the grinding member, means for giving the members a compound relative movement while in contact, said compound movement being composed of oscillation of one member around an axis intersecting the grinding member in a plane parallel to the sides thereof and linear translation of one member in a direction parallel to said axis of oscillation; substantially as described.

3. In a machine of the character described, a support for a grinding member, a support for a member engaging the grinding member, and means for giving said engaging member a compound movement while in contact with the grinding member, said compound movement being composed of oscillation around an axis intersecting the grinding member in a plane parallel to the sides thereof and linear movement parallel to said axis of oscillation; substantially as described.

4. In a machine of the character described, a support for a grinding wheel, a support for a member engaging the grinding wheel, means for oscillating said member around an axis to traverse it across the width of the grinding wheel, and means for shifting the member in the plane of the wheel as it oscillates across the wheel; substantially as described.

5. In a machine of the character described, a support for a grinding member, a support for a member engaging the grinding member, one of the supports comprising a shaft having rigid connection with one of the members, means for supporting the shaft for angular oscillation around an axis intersecting the grinding member in a plane parallel to the sides thereof, and means for causing the shaft to shift endwise as it oscillates; substantially as described.

6. In a machine of the character described, a support for a grinding member, a support for a member engaging the grinding member, one of the supports comprising a shaft having rigid connections with one of the members, means for supporting the shaft for angular oscillation, and means for causing the angular oscillation of the shaft to effect a relative linear translation between the members, the linear translation being directly proportional to the angular movement in each direction; substantially as described.

7. In a machine of the character described, a support for a grinding member, a support for a member engaging the grinding member, one of the supports comprising a shaft having connection with one of the members, means for supporting the shaft for angular oscillation, a cam, a cam follower, one of said last-named parts having connection with the shaft and the other part being relatively fixed whereby oscillation of the shaft causes it to shift endwise; substantially as described.

8. In a machine of the character described, a support for a grinding member, a support for a member engaging the grinding member, one of the supports comprising a shaft having connection with one of the members, means for supporting the shaft for angular oscillation on its axis, a cam, a cam follower, one of said last-named parts having connection with the shaft, means for oscillating the shaft to cause the cam follower to traverse the cam and move the shaft along its axis, and means for changing the inclination of the cam; substantially as described.

9. In a machine of the character described, a support for a grinding member, a support for a member engaging the grinding member, one of the supports comprising a shaft carrying one of the members, means for supporting the shaft for oscillation around its axis and for axial shifting, a cam, a cam follower, one of said last-named parts being carried by the shaft, the cam presenting a surface inclined to the axis of the shaft, and a pivotal mounting for the cam to provide for varying its inclination; substantially as described.

10. In a machine of the character described, a support for a grinding wheel, a member engaging the grinding wheel, a shaft having rigid connection with one of said parts, means for supporting the shaft for angular oscillation around a fixed axis, said axis being arranged to intersect the wheel, means for shifting the shaft lengthwise of its fixed axis as it oscillates around said axis, and the wheel and the member engaging one another in a plane inclined to said axis; substantially as described.

11. In a machine of the character described, a support for a grinding wheel, a member engaging the grinding wheel, a shaft having rigid connection with one of said parts, means for supporting the shaft for angular oscillation around its axis, means for shifting the shaft lengthwise of its axis as it oscillates around said axis, said axis being arranged to intersect the wheel, the wheel and the member engaging one another in a plane inclined to said axis, and means for causing relative movement between the wheel and the member in said inclined plane; substantially as described.

12. In a machine of the character described, a support for a grinding wheel, a member engaging the grinding wheel, a shaft having rigid connection with one of said parts, means for supporting the shaft for angular oscillation around its axis, said axis being fixed and arranged to intersect the wheel in a plane parallel to the sides of the wheel, and means to cause the shaft to shift axially on said fixed axis during said oscillation; substantially as described.

13. In a machine of the character described, a support for a grinding wheel, a support for a member engaging the grinding wheel, one of the supports comprising a shaft having an arm carrying the member, means for supporting the shaft for angular oscillation around a fixed axis to traverse the member across the width of the wheel, and means for shifting the shaft endwise on its axis as a consequence of and in direct relation to its oscillation in each direction; substantially as described.

14. In a machine of the character described, a support for a grinding wheel, a support for a member engaging the grinding wheel, one of the supports comprising an arm carrying the member, means for mounting the arm for angular oscillation around a fixed axis to traverse the member across the width of the wheel, and means for causing the arm to shift bodily in opposite directions lengthwise of said axis as a result of said oscillation; substantially as described.

15. In a machine of the character described, a support for a grinding wheel, a support for a member engaging the grinding wheel, one of the supports comprising a pair of connected arms of different length mounted to oscillate around an axis intersecting the grinding wheel, the member being carried by the shorter arm, and means cooperating with the longer arm for controlling movement of the member in a direction parallel to the axis of oscillation; substantially as described.

16. In a machine of the character described, a support for a grinding wheel, a support for a member engaging the grinding wheel, one of the supports comprising a shaft, an arm mounted on the shaft and carrying the member, means for supporting the shaft for angular oscillation around its axis, and means for adjusting the arm and the member with respect to the shaft in a direction crosswise of the wheel to locate the member in the plane of the wheel; substantially as described.

17. In a machine of the character described, a support for a grinding member, a support for a member engaging the grinding member, one of the supports comprising a shaft carrying one of the members, means for supporting the shaft for oscillation around its axis, an arm connected to the shaft, a cam, a cam follower, one of said last-named parts being carried by the arm, and means for varying the position of the arm on the shaft; substantially as described.

18. In a machine of the character described, a support for a grinding member, a support for a member engaging the grinding member, one of the supports comprising a shaft carrying one of the members, means for supporting the shaft for oscillation around its axis and for endwise shifting, a cam, a cam follower, one of said last-named parts being carried by the shaft whereby oscillation of the shaft causes it to shift endwise, and means for indicating the amplitude of endwise shifting; substantially as described.

19. In a machine of the character described, a support for a grinding member, a support for a member engaging the grinding member, one of the supports comprising a shaft connected to one of said members, means for supporting the shaft for oscillation around a fixed axis, means for shifting the shaft lengthwise of its fixed axis and a slide for moving one of the members, said slide being inclined with respect to the shaft at an angle to produce relative movement of the members along a radius of the grinding member; substantially as described.

20. In a machine of the character described, a support for a grinding wheel, a member engaging the grinding wheel, a shaft carrying the member, a carrier for supporting the shaft for oscillation around its axis, a slide for supporting the carrier, said slide being inclined with respect to the shaft at an angle to guide the member radially of the wheel, and means for shifting the slide at said angle; substantially as described.

21. In a machine of the character described, a support for a grinding wheel, a member engaging the grinding wheel, a shaft carrying the member, a carrier for supporting the shaft for oscillation around its axis, a slide for supporting the carrier, said slide being inclined with respect to the shaft at an angle to move the member radially of the wheel, and means for changing the inclination of the slide; substantially as described.

22. In a machine of the character described, a grinding wheel, a member for supporting a work-piece in engagement with the grinding wheel, a shaft connected to the member, means for supporting the shaft for oscillation around its axis, a slide for supporting the grinding wheel, said slide being inclined with respect to the shaft at an angle to move the grinding wheel along that radius where it is engaged by the work-piece; substantially as described.

23. In a machine of the character described, a work head, a grinding wheel head, means for oscillating one of said heads around a fixed axis parallel to the sides of the grinding wheel, and means for causing relative movement of translation between said heads in a direction parallel to the axis of oscillation; substantially as described.

24. In a machine of the character described, a work head, a grinding wheel head, means for oscillating one of said heads around an axis parallel to the sides of the grinding wheel, and means for causing said oscillation to effect a relative movement of translation between said heads in opposite directions parallel to the axis of oscillation; substantially as described.

25. In a machine of the character described, a work head, a grinding wheel head, means for oscillating one of said heads around an axis, a cam, a cam follower, and means for connecting one of said last-named members to the oscillating head whereby oscillation around an axis causes a relative movement of translation between the heads; substantially as described.

26. In a machine of the character described, a work-head having means to rotatably support a work-piece, a grinding wheel, a head for rotatably supporting the grinding wheel, means for oscillating one of the heads around an axis with the work and wheel in contact, the wheel engaging the work on a radius which is inclined with respect to the axis of oscillation, and means for effecting relative movement between the work-piece and the wheel in the plane of the wheel; substantially as described.

27. In a machine of the character described, a work head having means to rotatably support a work-piece, a grinding member, a head for supporting the grinding member in contact with the work-piece, means for oscillating one of the heads around an axis, the grinding member engaging the work on a line which is inclined with respect to said axis of oscillation, and means for effecting relative linear movement between the work-piece and the grinding member as said oscillation occurs; substantially as described.

28. The method of generating an elliptical curve transversely across the periphery of a circular member, which consists in establishing an axis in a fixed location in the plane of the circular member, and causing relative movement between the circular member and a generating member such that the point of engagement between the circular member and the generating member moves in a plane inclined to said established axis while kept at a constant distance from said axis; substantially as described.

29. The method of generating an elliptical curve transversely across the periphery of a grinding wheel, which consists in establishing an axis in the plane of the grinding wheel, and moving a generating member across the periphery of the wheel in a plane inclined to said axis while maintaining the generating member at a constant distance from said axis; substantially as described.

30. The method of grinding an elliptical curve transversely across the periphery of a circular work-piece which consists in establishing an axis in the plane of a grinding wheel, shifting said work-piece with respect to the grinding wheel in such manner that the point where the grinding wheel engages the work is maintained at a constant distance from said established axis and in a plane inclined to said axis; substantially as described.

31. The method of generating an elliptical surface of revolution on the periphery of a circular member which consists in establishing an axis of oscillation in a fixed location in the central plane of the circular member, rotating the circular member on its axis, and causing said circular member and a contacting generating member to have relative shifting movement at their point of contact, the relative shifting movement being compounded of angular oscillation of one of the members around said fixed axis of oscillation, and straight line reciprocation of one of the members in a direction parallel to said axis of oscillation and in proportion to the oscillation; substantially as described.

ATTILIO R. SPICACCI.